(12) United States Patent
Yamada et al.

(10) Patent No.: US 8,722,220 B2
(45) Date of Patent: May 13, 2014

(54) HYDROPHOBIC CATALYST LAYER FOR POLYMER ELECTROLYTE FUEL CELL AND METHOD OF PRODUCING THE SAME, AND POLYMER ELECTROLYTE FUEL CELL AND METHOD OF PRODUCING THE SAME

(71) Applicant: Canon Kabushiki Kaisha, Tokyo (JP)

(72) Inventors: Kazuhiro Yamada, Yokohama (JP); Kazuya Miyazaki, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/799,970

(22) Filed: Mar. 13, 2013

(65) Prior Publication Data

US 2013/0196846 A1 Aug. 1, 2013

Related U.S. Application Data

(60) Division of application No. 11/550,123, filed on Oct. 17, 2006, which is a continuation of application No. PCT/JP2006/309356, filed on Apr. 28, 2006.

(30) Foreign Application Priority Data

Apr. 28, 2005 (JP) ................................. 2005-132957

(51) Int. Cl.
*H01M 4/04* (2006.01)
*H01M 4/36* (2006.01)

(52) U.S. Cl.
USPC .............. 429/44; 501/101; 501/102; 501/103

(58) Field of Classification Search
None
See application file for complete search history.

(56) References Cited

U.S. PATENT DOCUMENTS

| 3,440,107 | A | | 4/1969 | Barber |
| 5,500,292 | A | | 3/1996 | Muranaka et al. |
| 5,879,827 | A | | 3/1999 | Debe et al. |
| 6,040,077 | A | | 3/2000 | Debe et al. |
| 6,046,348 | A | * | 4/2000 | Yamada et al. ............... 556/413 |

(Continued)

FOREIGN PATENT DOCUMENTS

| EP | 1 096 587 A1 | 5/2001 |
| EP | 1 284 154 A2 | 2/2003 |

(Continued)

OTHER PUBLICATIONS

Office Action in Indian Application No. 5459/CHENP/2007 (Jun. 2011).

(Continued)

*Primary Examiner* — Alix Echelmeyer
(74) *Attorney, Agent, or Firm* — Fitzpatrick, Cella, Harper & Scinto

(57) ABSTRACT

Provided is a hydrophobic catalyst layer for a polymer electrolyte fuel cell to which hydrophobicity is imparted so that the dissipation property of produced water is improved and which simultaneously has an increased effective surface area and an increased utilization ratio of a catalyst, and a method of producing the same. The catalyst layer for a polymer electrolyte fuel cell includes a catalyst obtained by reducing a platinum oxide, a hydrophobic agent, and a proton conductive electrolyte, wherein the hydrophobic agent is mainly composed of alkylsiloxane. An Si compound containing a hydrophobic substituent is brought into contact with a platinum oxide to subject the Si compound to hydrolysis and a polymerization reaction by the catalytic action of the platinum oxide, and then it is reduced, thereby obtaining a hydrophobic catalyst layer carrying an alkylsiloxane polymer.

3 Claims, 11 Drawing Sheets

(56) References Cited

U.S. PATENT DOCUMENTS

| | | | |
|---|---|---|---|
| 6,811,905 B1 | 11/2004 | Cropley et al. | |
| 8,551,902 B2 * | 10/2013 | Yamada | 502/101 |
| 2002/0001744 A1 * | 1/2002 | Tsusaka et al. | 429/42 |
| 2004/0096729 A1 | 5/2004 | Tanaka et al. | |
| 2005/0227862 A1 * | 10/2005 | Cao et al. | 502/185 |
| 2007/0099066 A1 | 5/2007 | Okumura et al. | |
| 2007/0212591 A1 | 9/2007 | Miyazaki et al. | |

FOREIGN PATENT DOCUMENTS

| | | | |
|---|---|---|---|
| JP | 9-510571 A | 10/1997 |
| JP | 2001-76734 A | 3/2001 |
| JP | 2001-519594 A | 11/2001 |
| JP | 2002-8667 A | 1/2002 |
| JP | 3245929 B2 | 1/2002 |
| JP | 2004-103384 A | 4/2004 |
| JP | 2004-171847 A | 6/2004 |
| JP | 2004-172098 A | 6/2004 |
| JP | 2006-49278 A | 2/2006 |
| WO | 95/21465 A1 | 8/1995 |
| WO | 99/19066 A1 | 4/1999 |
| WO | 2006/004023 A1 | 1/2006 |

OTHER PUBLICATIONS

Extended European Search Report in European Application No. 06732508.4 (Feb. 24, 2012).

International Preliminary Report on Patentability (with Written Opinion) in PCT/JP2006/309356 (mailed Oct. 2007).

International Search Report in PCT/JP2006/309356 (mailed Aug. 2006).

* cited by examiner

HYDROPHOBIC CATALYST LAYER FOR POLYMER ELECTROLYTE FUEL CELL AND METHOD OF PRODUCING THE SAME, AND POLYMER ELECTROLYTE FUEL CELL AND METHOD OF PRODUCING THE SAME

CROSS-REFERENCE TO RELATED APPLICATIONS

This application is a divisional of U.S. application Ser. No. 11/550,123, filed Oct. 17, 2006, which is a continuation of International Application No. PCT/JP2006/309356, filed Apr. 28, 2006, which claims the benefit of Japanese Patent Application No. 2005-132957, filed Apr. 28, 2005.

BACKGROUND OF THE INVENTION

1. Field of the Invention

The present invention relates to a hydrophobic catalyst layer for a polymer electrolyte fuel cell and a method of producing the same, and a polymer electrolyte fuel cell and a method of producing the same.

2. Description of the Related Art

A polymer electrolyte fuel cell is expected to be an energy generating apparatus in the future because the cell has high energy conversion efficiency, and is clean and quiet. Investigation has been recently conducted into the application of the polymer electrolyte fuel cell to not only a power source for an automobile, a domestic generator, or the like but also a power source for, for example, a small-size electrical apparatus such as a portable phone, a notebook personal computer, or a digital camera because the polymer electrolyte fuel cell has a high energy density and can operate at a low temperature. The polymer electrolyte fuel cell has been attracting attention because it may be driven for a long time period as compared to a conventional secondary battery.

The polymer electrolyte fuel cell has an advantage in that it can be driven even at an operating temperature of 100° C. or lower. On the other hand, the polymer electrolyte fuel cell has a problem in that the voltage of the cell gradually reduces with the lapse of an electricity generating time, and finally the cell stops generating electricity.

Such problem results from a so-called "flooding phenomenon" in which water produced as a result of a reaction resides in gaps of a catalyst layer, and water clogs the gaps in the catalyst layer to inhibit the supply of a fuel gas as a reactant, so that an electricity generation reaction is stopped. Flooding is apt to occur particularly in a catalyst layer on a cathode side where water is produced.

In addition, a reduction in size of the entire system is essential to the practical use of the polymer electrolyte fuel cell for a small-size electrical apparatus. In particular, in the case where the fuel cell is mounted on a small-size electrical apparatus, not only the size of the entire system but also the size of the cell itself must be reduced. Accordingly, a mode (air breathing) in which the air is supplied from an air hole to an air electrode through natural diffusion without the use of a pump, blower, or the like is considered to be promising.

In such case, the produced water is discharged to the outside of the fuel cell only by natural evaporation, so that the produced water resides in a catalyst layer to cause flooding in many cases. Accordingly, imparting hydrophobicity to the catalyst layer to improve the dissipation property of the produced water is considered to be an important factor on which the stability of the performance of the fuel cell depends.

A conventionally known method of making a catalyst layer hydrophobic involves mixing a fluorine resin-based fine particle powder made of polytetrafluoroethylene (PTFE) or the like as a hydrophobic agent with a solvent or a surfactant upon formation of the catalyst layer.

In addition, there have been proposed a method involving imparting the concentration distribution of hydrophobicity to the thickness direction of a catalyst layer to improve the dissipation property of produced water additionally (Japanese Patent No. 3245929), and a method involving making a part to which hydrophobicity is imparted maldistributed in the surface of a catalyst layer (Japanese Patent Application Laid-Open No. 2004-171847).

In addition, Japanese Patent Application Laid-Open No. 2001-76734 discloses a method of mixing fine particles composed of dimethylpolysiloxane in addition to fluorine-based resin fine particles. Japanese Patent Application Laid-Open No. 2001-76734 describes that the particle size of each of the hydrophobic fine particles is equal to that of a carbon carrier particle, and is preferably 10 µm or less.

Meanwhile, Japanese Patent Application Laid-Open No. 2006-49278 and Japanese-translated version's National Publication No. 2001-519594 each disclose a method of forming a catalyst layer for a fuel cell by means of a sputtering method or an ion plating method.

As described above, an approach of forming a catalyst layer by means of a vacuum film formation process such as a sputtering method has been recently developed. A conventional method involves: mixing catalyst particles, an electrolyte, and a solvent to prepare slurry; and mixing the slurry with hydrophobic particles to make the slurry hydrophobic. On the other hand, such production method as described in each of Japanese Patent Application Laid-Open No. 2006-49278 and Japanese-translated version's National Publication No. 2001-51959 does not involve mixing hydrophobic fine particles upon formation of a catalyst layer. That is, hydrophobicity is not imparted by means of a mixing method.

SUMMARY OF THE INVENTION

Hydrophobic fine particles that have been conventionally used such as those described in Japanese Patent Application Laid-Open No. 2001-76734 have neither conductivity nor proton conductivity, and are mixed with and randomly dispersed into catalyst particles, an electrolyte, carrier particles, and the like.

Accordingly, when conventional hydrophobic fine particles are used, the hydrophobicity of a catalyst layer improves, but there arises a problem in that part of the hydrophobic fine particles enter a gap between adjacent catalyst particles or between a catalyst and the electrolyte, so that a proton adsorption area of the surface of the catalyst, that is, an effective surface area reduces, and hence the utilization factor of the catalyst reduces.

Furthermore, the diameter of each of fluorine resin-based hydrophobic fine particles that have been conventionally and generally used in a wide variety of applications is about 100 nm to several hundreds of micrometers, and the diameter of a secondary agglomerate particle is additionally large. Even the diameter of each of the hydrophobic particles described in Japanese Patent Application Laid-Open No. 2001-76734 is about 10 µm which is almost equal to that of a carbon carrier particle.

Since the conventional hydrophobic particles each have such particle size, it is impossible in principle to make the inside of a gap having a size of less than 100 nm in a catalyst layer (hereinafter referred to as the "micro-gap") hydrophobic. In this case, the inside of the micro-gap remains hydrophilic. Accordingly, when the outside of the micro-gap is made hydrophobic by a large hydrophobic particle, produced water is trapped in the micro-gap in some cases. As a result, there arises a problem in that local flooding occurs in the micro-gap to reduce the utilization factor of a catalyst.

In addition, a conventional hydrophobic agent is granular. Accordingly, when the size of each of hydrophobic fine particles is almost equal to that of each of gaps, the gaps are clogged with the hydrophobic fine particles, and the gas permeability of a reactant gas reduces. Accordingly, a reaction in each of the gaps stops. As a result, there arises a problem in that the utilization factor of a catalyst reduces.

As described above, in the prior art there is a problem of imperfectly imparting hydrophobicity to a catalyst layer, and simultaneously reducing the utilization factor of a catalyst occurs.

As a result, conventionally, as compared to the case where no hydrophobicity is imparted, the voltage of a fuel cell in a high-current-density region increases, but the voltage of the fuel cell in a low-current-density region reduces.

Accordingly, a technique for achieving compatibility between the impartment of hydrophobicity to a catalyst layer and an increase in utilization factor of a catalyst has been requested.

Meanwhile, when a catalyst layer is formed by means of a sputtering method or the like as shown in each of Japanese Patent Application Laid-Open No. 2006-49278 and Japanese-translated version's National Publication No. 2001-51959, the catalyst layer cannot be formed by mixing hydrophobic fine particles unlike the prior art, so that hydrophobicity cannot be imparted by means of a conventional mixing method. In this case, there arises the following problem: even when conventional fluorine resin-based hydrophobic fine particles are applied to a catalyst layer after the formation of the catalyst layer, most of the diameters of the pores of the catalyst layer are about several hundreds of nanometers and smaller than that of each of the hydrophobic fine particles, so that the hydrophobic fine particles are not dispersed into the catalyst layer, and hydrophobicity cannot be effectively imparted to the inside of the catalyst layer.

The present invention has been accomplished in view of such circumstances as described above, and provides a hydrophobic catalyst layer for a polymer electrolyte fuel cell, in which hydrophobicity is effectively imparted to also a micro-gap inside the catalyst layer, and simultaneously an effective surface area and an increased utilization factor of a catalyst are increased. In addition, the present invention can provide hydrophobicity and an increase in effective surface area for even a catalyst layer formed by means of a sputtering method.

In addition, the present invention provides, at a low cost, a polymer electrolyte fuel cell having stable electricity generation property by using the above hydrophobic catalyst layer to which hydrophobicity is imparted.

The present invention has been accomplished in order to solve the above-mentioned problems.

That is, the present invention provides a hydrophobic catalyst layer for a polymer electrolyte fuel cell, including: a catalyst, a hydrophobic agent, and a proton conductive electrolyte, wherein the catalyst is a dendritic-shaped catalyst obtained by reducing a platinum oxide, wherein the hydrophobic agent is composed of a compound having an Si atom, an O atom, and a hydrophobic substituent, and wherein a ratio Si/Pt of a number of Si atoms in the hydrophobic agent to a number of Pt atoms in the catalyst is in a range of 0.15 or more and 0.25 or less.

The hydrophobic agent is preferably composed of a siloxane polymer having a hydrophobic substituent.

In addition, the hydrophobic agent is preferably composed of alkylsiloxane.

Further, the present invention provides a method of producing a hydrophobic catalyst layer for a polymer electrolyte fuel cell, including the steps of: bringing an Si compound containing a hydrophobic substituent, which causes a hydrolytic reaction owing to a catalytic action of a platinum oxide to form a polymerizable group, into contact with the platinum oxide; subjecting the Si compound to a polymerization reaction in a vicinity of the platinum oxide to form a hydrophobic agent on a surface of the platinum oxide; and reducing then the platinum oxide.

The Si compound is preferably at least one or more compounds selected from the group consisting of 2,4,6,8-tetraalkylcyclotetrasiloxane, 1,1,1,3,3,3-hexaalkyldisilazane, monoalkylsilane, dialkylsilane, and trialkylsilane, or a mixture thereof.

Further, the present invention provides a polymer electrolyte fuel cell including the hydrophobic catalyst layer.

According to the present invention, the hydrolysis and polymerization reaction of an Si compound containing a hydrophobic substituent are initiated on the surface of a platinum oxide so that a hydrophobic agent is formed in the inside of each pore of a catalyst layer including the inside of a micro-gap. After that, the oxide is reduced, whereby the utilization factor of a catalyst and the dissipation property of produced water can be simultaneously improved.

The hydrophobic agent is formed from an Si compound molecule smaller than a micro-gap in each pore of the catalyst layer by the polymerization reaction, so that the impartment of hydrophobicity to the inside of a micro-gap having a size of 100 nm or less which has been conventionally difficult is attained.

In addition, the present invention provides, at a low cost, a polymer electrolyte fuel cell having stable characteristics by using the above catalyst layer with improved dissipation property of the produced water.

Further, the present invention can provide a polymer electrolyte fuel cell having additionally stable characteristics at a low cost.

Furthermore, according to the present invention, a contact area between a catalyst and an electrolyte, that is, an effective surface area that can contribute to a catalytic reaction can be increased, whereby the utilization factor of the catalyst can be increased.

As a result, the simultaneous achievement of the impartment of hydrophobicity and an increase in utilization factor of a catalyst which has been conventionally difficult is enabled. In addition, the increase in utilization factor of the catalyst can reduce a catalyst carrying amount, so that a production cost can be reduced.

In addition, the present invention can provide, at a low cost, a polymer electrolyte fuel cell having stable electricity generation property by using the above catalyst with improved dissipation property of the produced water and an increased utilization factor of the catalyst (hereinafter referred to as "hydrophobic catalyst"). Furthermore, a method of producing a catalyst layer of the present invention can realize a catalyst layer for a polymer electrolyte fuel cell at a low cost through an easy, inexpensive, and highly reproducible step.

According to the present invention, there can be provided a hydrophobic catalyst layer for a polymer electrolyte fuel cell which has achieved compatibility between an improvement in dissipation property of produced water and an increase in utilization factor of a catalyst in the catalyst layer.

In addition, the present invention can provide, at a low cost, a polymer electrolyte fuel cell having stable electricity generation property by using the above hydrophobic catalyst layer to which hydrophobicity is imparted.

Further features of the present invention will become apparent from the following description of exemplary embodiments with reference to the attached drawings.

DESCRIPTION OF THE EMBODIMENTS

Hereinafter, an embodiment of a hydrophobic catalyst layer for a polymer electrolyte fuel cell according to the present invention will be shown and described with reference to the drawings. However, materials, dimensions, shapes, arrangement, and the like described in this embodiment do not limit the scope of the present invention unless otherwise specifically stated. The same is applied to a production method to be described later.

Figure 1:
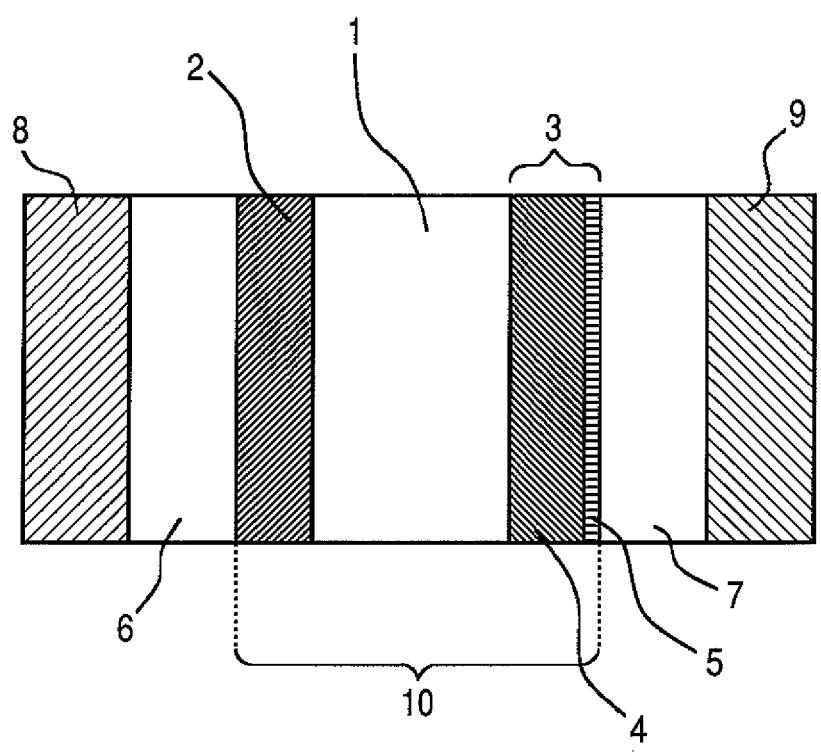
FIG. 1 is a schematic view showing the single cell structure of a polymer electrolyte fuel cell using a hydrophobic catalyst layer of the present invention.

FIG. 1 is a schematic view showing an example of the sectional constitution of a single cell of the fuel cell using the hydrophobic catalyst layer for a polymer electrolyte fuel cell according to the present invention (hereinafter abbreviated as "hydrophobic catalyst layer"). In FIG. 1, reference numeral 1 denotes a solid polymeric electrolyte membrane. A pair of catalyst layers, that is, a catalyst layer 2 on an anode side and a catalyst layer 3 on a cathode side are arranged so that the solid polymeric electrolyte membrane 1 is sandwiched between them.

In this example, a case in which the hydrophobic catalyst layer of the present invention is arranged only on a cathode (air electrode) side is shown. However, the arrangement and constitution of the catalyst layer are not limited to this case.

For example, the hydrophobic catalyst layer of the present invention may be arranged on each of both electrodes, or may be arranged only on an anode side. In view of the fact that flooding is apt to occur in a catalyst layer on a cathode side where water is produced, the hydrophobic catalyst layer of the present invention is preferably arranged at least on the cathode side.

The catalyst layer 3 on the cathode side is constituted by a hydrophobic catalyst 4 and a catalyst carrier 5 for supporting the hydrophobic catalyst 4. A gas-diffusion layer 7 on the cathode side and an electrode (air electrode) 9 on the cathode side are arranged outside the catalyst layer 3 on the cathode side.

A gas-diffusion layer 6 on the anode side and an electrode (fuel electrode) 8 on the anode side are arranged outside the catalyst layer 2 on the anode side.

A perfluorocarbon polymer having a sulfonic group can be suitably used as the solid polymeric electrolyte membrane 1.

An example of a perfluorosulfonic acid polymer is Nafion (registered trademark, manufactured by DuPont).

When a proton H$^+$ moves in an electrolyte membrane toward a cathode side, the proton moves along a hydrophilic part in the electrolyte membrane while using a water molecule as a medium in many cases. Accordingly, the electrolyte membrane preferably has a function of holding a water molecule.

The solid polymeric electrolyte membrane preferably has a function of preventing unreacted reactant gases (hydrogen and oxygen) from passing while transmitting a proton H$^+$ produced on the anode side toward the cathode side and a predetermined function of holding water. An arbitrary material can be selected from materials each having such functions in consideration of various conditions, and can be used in the solid polymeric electrolyte membrane.

The gas-diffusion layers 6 and 7 each preferably have the following functions: a function of uniformly and sufficiently supplying a fuel gas or the air to an electrode reaction region in a catalyst layer of a fuel electrode or an air electrode in such a manner that an electrode reaction can be efficiently performed in plane, a function of releasing charges generated by the electrode reaction to the outside of the single cell, and a function of efficiently discharging water produced as a result of a reaction and an unreacted gas to the outside of the single cell. A porous material having electron conductivity such as carbon cloth or carbon paper can be preferably used as the gas-diffusion layer.

Examples of a role of the catalyst carrier 5 to be expected include: a co-catalyst for improving catalytic activity; the maintenance of the form of the hydrophobic catalyst 4; the securement of an electron conduction channel; and an increase in specific surface area. For example, a carbon black layer or a gold fine particle layer can be preferably used as the catalyst carrier.

Figure 2:
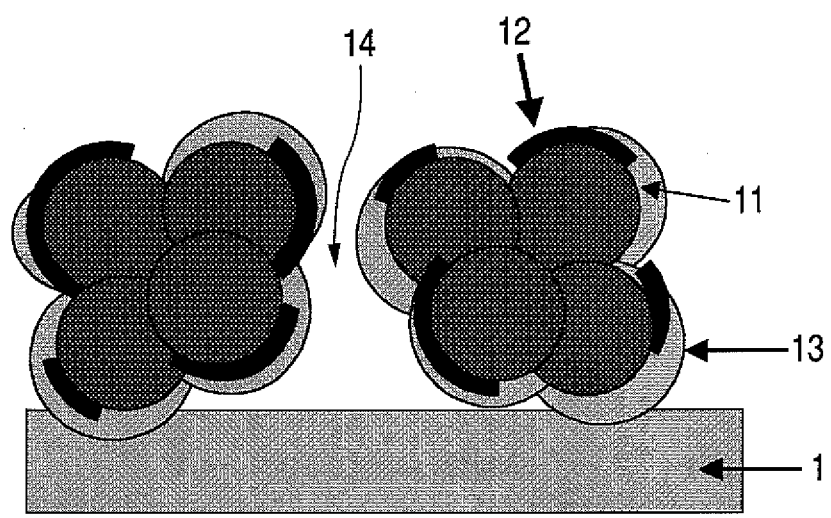
FIG. 2 is a schematic view showing an example of a hydrophobic catalyst in the hydrophobic catalyst layer of the present invention.

Next, FIG. 2 schematically shows the structure of the hydrophobic catalyst 4. The hydrophobic catalyst 4 is composed of a catalyst 11, a hydrophobic agent 12, and an electrolyte 13. The hydrophobic agent 12 also enters a micro-gap 14 in the catalyst layer.

In a preferable production method of the present invention, after the hydrophobic agent 12 is formed on the catalyst 11, the electrolyte 13 is formed. Therefore, the electrolyte 13 covers the hydrophobic agent 12 in some positions as shown in FIG. 2.

Here, the amount of the hydrophobic agent 12 is such that a ratio of the number of Si atoms in the hydrophobic agent 12 to the number of Pt atoms in the catalyst 11 is in the range of preferably 0.15 or more and 0.25 or less, or more preferably 0.18 or more and 0.22 or less.

When the amount of the hydrophobic agent 12 is excessively large, the performance of the catalyst layer reduces because (1) most of the pores of the catalyst layer are clogged so that gas diffusion property reduces and (2) the surface of the catalyst is excessively covered with the hydrophobic agent 12 so that a contact area between the electrolyte and the catalyst reduces.

In contrast, when the amount of the hydrophobic agent 12 is excessively small, the catalyst layer cannot obtain sufficient hydrophobicity.

The catalyst 11 is composed of the aggregate of platinum nano-particles obtained by reducing a platinum oxide, and has a dendritic shape.

The term "dendritic" as used herein refers to a structure in which a large number of flaky tissues each constituted as a result of the aggregation of catalyst particles aggregate together while having branch points.

One flaky tissue preferably has a length in its shorter-side direction in the range of 5 nm or more and 200 nm or less. The term "length in a shorter-side direction" as used herein refers to the minimum dimension in the surface of one flake. With regard to the aggregate of platinum nano-particles having a "dendritic" shape, the technique disclosed in Japanese Patent Application Laid-Open No. 2006-49278 is applicable to the present invention.

The platinum nano-particles each preferably have a diameter of about 3 to 20 nm because of high catalytic activity, and each particularly preferably have a diameter of 3 to 10 nm because of a large surface area.

When the diameter of each of the platinum nano-particles is 20 nm or more, catalytic activity reduces, whereby the performance of a fuel cell may reduce.

A method of producing a hydrophobic catalyst layer of the present invention is characterized by including the steps of: bringing an Si compound containing a hydrophobic substituent that causes a hydrolytic reaction by the catalytic action of a platinum oxide to form a polymerizable group into contact with the platinum oxide; subjecting the Si compound to hydrolysis and a polymerization reaction in the vicinity of the platinum oxide to from a hydrophobic agent on the surface of the platinum oxide; and then reducing the platinum oxide.

It is not preferable to perform the step of bringing the Si compound into contact with the platinum oxide after the step of reducing the platinum oxide. When platinum after reduction and the Si compound are brought into contact with each other, a hydrolytic reaction proceeds at a high reaction rate, whereby an excessive amount of alkylsiloxane is formed in the catalyst layer to degrade adhesiveness with an electrolyte membrane or to clog pores in the catalyst layer.

In addition, the step of bringing the Si compound into contact with the platinum oxide is preferably conducted for 3 to 30 minutes. When the contact time of the Si compound in contact with the platinum oxide is excessively short, a sufficient effect of the contact may not be obtained. In contrast, when the contact time of the Si compound in contact with the platinum oxide is excessively long, an excessive amount of alkylsiloxane is formed to degrade adhesiveness with an electrolyte membrane or to clog pores in the catalyst layer, so that the output of a fuel cell reduces in some cases.

Platinum dioxide or a mixture of metal oxides mainly composed of platinum dioxide is more preferably used as the platinum oxide for use in the above-described step because the catalyst 11 is of a dendritic shape and the porosity of the catalyst layer increases.

In addition, the term "platinum dioxide" as used herein includes not only one represented by a chemical formula $PtO_2$ but also one represented by a chemical formula $PtO_X$ (X>2). Even when one represented by the chemical formula $PtO_X$ (X>2) is used, an effect of the present invention can be obtained in the production method of the present invention.

Examples of the hydrophobic substituent to be used in the present invention include alkyl groups (the carbon chain of each of which may be branched or may have a double bond, and a hydrogen atom of each of which may be substituted by a halogen atom). A methyl group can be particularly preferably used.

In addition, the Si compound containing the hydrophobic substituent is preferably a compound selected from the group consisting of 2,4,6,8-tetraalkylcyclotetrasiloxane, 1,1,1,3,3,3-hexaalkyldisilazane, monoalkylsilane, dialkylsilane, and trialkylsilane, or a mixture thereof.

It is generally known that the contact of the above Si compound with a metal or the like causes a hydrolytic reaction to form Si—OH groups, whereby a dehydration condensation polymerization reaction between the Si—OH groups occurs to form a siloxane polymer having an Si atom, an O atom, and a hydrophobic substituent. Here, an alkylsiloxane polymer is produced when the hydrophobic substituent in the Si compound is an alkyl group.

The above hydrolytic reaction is known to occur owing to contact with a metal, and also hydrolysis and a polymerization reaction proceed even owing to contact with a platinum oxide.

The production method of the present invention utilizes the phenomenon. The contact of a platinum oxide with the Si compound for an appropriate time period can produce an appropriate amount of an alkylsiloxane polymer in the catalyst layer, whereby hydrophobicity can be effectively imparted.

When the hydrolytic reaction of the Si compound is caused by contact with platinum, there is a high possibility that a reaction rate becomes so high that an excessive amount of an alkylsiloxane polymer is produced in a short time period to degrade adhesiveness with an electrolyte membrane or to clog pores in the catalyst layer.

Accordingly, it is strongly recommended that the step of bringing the Si compound into contact with the platinum oxide be performed prior to the step of reducing the platinum oxide.

In addition, when 1,1,1,3,3,3-hexaalkyldisilazane or trialkylsilane is used alone, since the number of polymerizable groups in one molecule is small, a part of hydrophobic substituents is preferably hydrolyzed to form Si—OH groups by substitution as means of an approach such as irradiation with UV so that a polymerization reaction can be promoted.

A dehydration condensation polymerization reaction between Si—OH groups proceeds even at room temperature, but an operation for heating the catalyst layer is more preferably added after the formation of the hydrophobic agent. In such case, heating can polymerize unpolymerized Si—OH groups in the hydrophobic agent, whereby hydrophobicity can be further improved.

The temperature at the time of a heating treatment is preferably such that none of the hydrophobic substituent and any material in the catalyst layer undergoes heat decomposition, and is more preferably 200° C. or lower.

In general, it is also important to increase the utilization efficiency of a catalyst as well as hydrophobicity in order to obtain a catalyst layer having high performance. The hydrophobic catalyst 4 of the present invention is characterized in that a proton adsorption area in the surface of the catalyst, that is, an effective surface area is larger than that in the case where no hydrophobic treatment is performed, so that the utilization factor of the catalyst is high.

To obtain the above characteristic, a proton conductive electrolyte is preferably formed in the catalyst layer by adding, for example, a perfluorosulfonic acid polymer solution after the formation of the hydrophobic agent. The proton conductive electrolyte is more preferably formed after the reduction of the platinum oxide.

The above procedure improves wettability between the hydrophobic portion of an electrolyte molecule and the hydrophobic agent. This case is preferable because wettability between a part of the surface of the catalyst in no contact with the hydrophobic agent and the hydrophilic portion of a proton conductive electrolyte molecule relatively improves, so that an effective surface area in the hydrophobic catalyst 4 is larger than that of a catalyst not subjected to any hydrophobic treatment.

Examples of the method of producing the hydrophobic catalyst layer of the present invention include various methods. An example of the method will be described below by taking the case of the constitution shown in FIG. 1 as an example. It should be noted that the present invention is not limited to the following production method at all.

(1) Prepare Catalyst Layer on Cathode Side

After Au serving as a catalyst carrier has been formed into a film by means of an electron beam evaporation method on a polytetrafluoroethylene (PTFE) sheet as a layer to be transferred onto a solid polymeric electrolyte membrane, a porous platinum oxide catalyst layer is formed by means of a reactive sputtering method.

(2) Subject Catalyst Layer to Hydrophobic Treatment

The catalyst layer obtained in the above item (1) is brought into contact with the gas of an Si compound containing a hydrophobic substituent, whereby a hydrophobic agent is formed on the surface of a catalyst. After that, the polymerization reaction of the hydrophobic agent may be promoted by heating.

Subsequently, the platinum oxide layer is subjected to a hydrogen reduction treatment, whereby a porous platinum/gold catalyst layer is obtained. After that, an appropriate amount of a solution of Nafion serving as a proton conductive electrolyte in IPA (5 wt. %, manufactured by Wako Pure Chemical Industries, Ltd.) is dropped onto the formed catalyst layer. After that, the solvent is volatilized in a vacuum, whereby a proton path is formed on the surface of the catalyst.

(3) Prepare Catalyst Layer on Anode Side

A catalyst layer of platinum on carbon support is formed on a PTFE sheet by using a doctor blade in the same manner as in the above item (1). The thickness of the catalyst layer is preferably in the range of 20 to 40 μm.

A catalyst slurry to be used here is a kneaded product of platinum on carbon support (HiSPEC 4000 manufactured by Johnson Matthey), Nafion, PTFE, isopropyl alcohol (IPA), and water.

(4) A solid polymeric electrolyte membrane (Nafion 112 manufactured by DuPont) is sandwiched between the pair of catalyst layers produced in the foregoing such that the PTFE sheets face outward, and the sandwiched body is subjected to hot pressing. Furthermore, the PTFE sheets are peeled, whereby the pair of catalyst layers is transferred onto the solid polymeric electrolyte membrane. Then, the electrolyte membrane and the pair of catalyst layers are assembled to obtain a membrane electrode assembly (hereinafter abbreviated as "MEA").

(5) The MEA is sandwiched by carbon cloth (LT 1400-W manufactured by E-TEK) serving as a gas baking layer, and further by a fuel electrode and an air electrode, whereby a single cell is produced.

The method of producing the catalyst layer of the present invention is applicable to not only the above polymer electrolyte fuel cell having a single cell constitution but also a polymer electrolyte fuel cell constituted by stacking multiple single cells.

EXAMPLES

Next, the present invention will be described in detail by way of specific examples.

Example 1

In this example, a polymer electrolyte fuel cell having the constitution shown in FIG. 1 as the embodiment of the present invention was produced.

Hereinafter, the production steps of the polymer electrolyte fuel cell according to this example will be described in detail.

(Step 1)

A gold thin film having a thickness of 50 nm was formed by means of an electron beam vacuum evaporation method on a PTFE sheet (NITFLON manufactured by NITTO DENKO CORPORATION) as a layer to be transferred onto a polymeric electrolyte membrane. A porous platinum oxide layer having a thickness of 2 μm was formed thereon by means of a reactive sputtering method. The reactive sputtering was performed under the conditions of: a total pressure of 5 Pa; an oxygen flow rate ratio ($Q_{O2}/(Q_{Ar}+Q_{O2})$) of 70%; a substrate temperature of 25° C.; and an RF input power of 5.4 W/cm².

(Step 2)

Subsequently, the porous platinum oxide layer was brought into contact with the steam of 2,4,6,8-tetramethylcyclotetrasiloxane (hereinafter abbreviated as "TMCTS") (having a partial pressure of 0.05 Pa) at 25° C. for 30 minutes, whereby a methylsiloxane polymer was produced on the surface of platinum oxide. After that, it was subjected to a heat treatment in the atmosphere at 180° C. for 3 hours, whereby the condensation polymerization of unpolymerized Si—OH groups was promoted.

(Step 3)

Subsequently, the obtained catalyst layer was subjected to a reduction treatment in a 2% $H_2$/He atmosphere at 0.1 MPa for 30 minutes, whereby a porous platinum catalyst layer was obtained on the PTFE sheet. The Pt carrying amount in this case was 0.85 mg/cm². The equilibrium contact angle of the catalyst layer with respect to water at this time was 138°, and the surface of the catalyst layer was hydrophobic.

Figure 4:
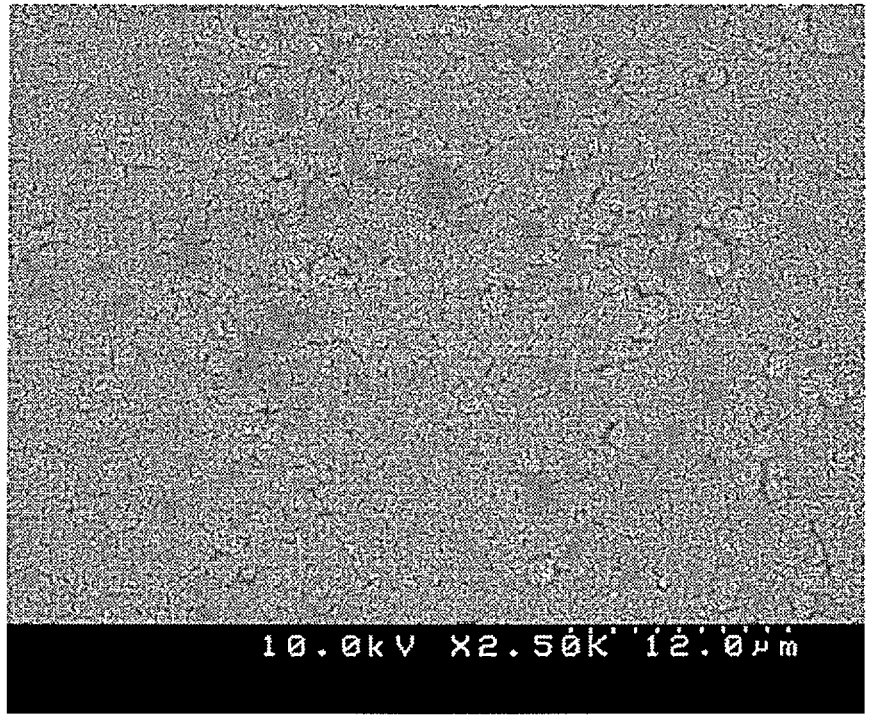
FIG. 4 is a scanning electron micrograph (at a magnification of 2,500) of the surface of a hydrophobic catalyst layer of Example 1 of the present invention.
Figure 5:
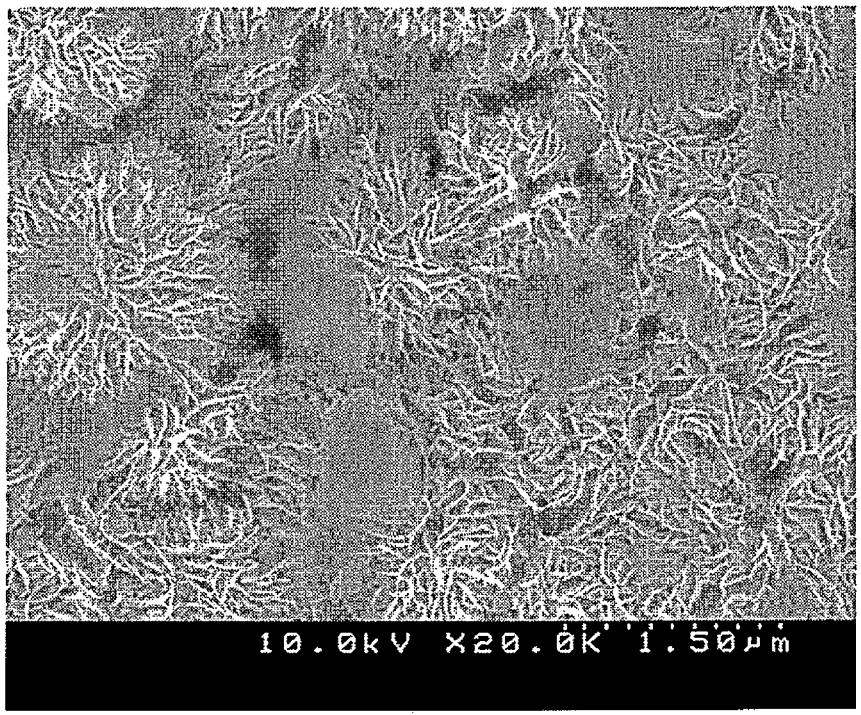
FIG. 5 is a scanning electron micrograph (at a magnification of 20,000) of the surface of the hydrophobic catalyst layer of Example 1 of the present invention.
Figure 6:
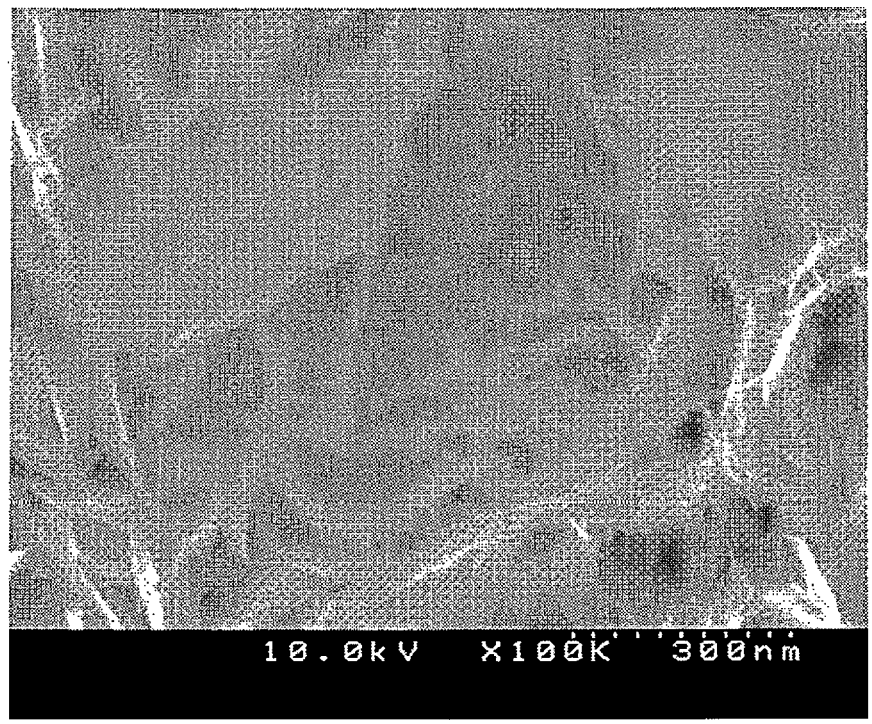
FIG. 6 is a scanning electron micrograph (at a magnification of 100,000) of the surface of the hydrophobic catalyst layer of Example 1 of the present invention.

In addition, a scanning electron microscope was used to observe that methylsiloxane polymers were present on the catalyst layer as shown in each of FIGS. 4 to 6. In each of FIGS. 4 to 6, a dark spot-like part is a methylsiloxane polymer produced on a catalyst.

As can be seen from FIG. 6, a methylsiloxane polymer enters even a micro-gap having a size of 100 nm or less in the catalyst layer.

The methylsiloxane polymer shown in FIG. 6 is a relatively large polymer in the entire layer which is zoomed in for aiding the understanding of the gist of the present invention. A large number of polymers each having a size of several tens of nanometers and smaller than the above relatively large polymer were also present in the catalyst layer.

In addition, a part other than a dark spot-like part shown in FIG. 5 shows a dendritic-shaped catalyst, that is, the catalyst has a shape of aggregate of a large number of flaky tissues having branch points. Observation with a transmission electron microscope (TEM) confirmed that each of the flaky parts was the aggregate of platinum fine particles each having a diameter of about 5 to 10 nm.

A ratio Si/Pt of the number of Si atoms in the obtained catalyst layer to the number of Pt atoms in the layer measured by using a scanning fluorescent X-ray analyzer (ZSX 100e manufactured by Rigaku Corporation) was 0.22.

After that, a 5-wt. % Nafion solution (manufactured by Wako Pure Chemical Industries, Ltd.) was dropped to the obtained catalyst layer in an amount of 8 μl per 1 $cm^2$ of a catalyst area, and the solvent was volatilized in a vacuum, whereby a proton path was formed on the surface of the catalyst.

(Step 4)

In this step, a catalyst layer of platinum on carbon support was produced as a catalyst layer to form a pair with the catalyst layer produced in (Step 3) described above. The catalyst layer of platinum on carbon support was formed on a PTFE sheet as a layer to be transferred onto a solid polymeric electrolyte membrane by using a doctor blade. A catalyst slurry used here was a kneaded product of platinum on carbon support (HiSPEC 4000 manufactured by Johnson Matthey), Nafion, IPA, and water. The Pt carrying amount in this case was 0.35 mg/$cm^2$.

(Step 5)

A solid polymeric electrolyte membrane (Nafion 112 manufactured by DuPont) was sandwiched between the two catalyst layers produced in (Step 3) and (Step 4) described above, and they were subjected to hot pressing under the pressing conditions of 8 MPa, 150° C., and 1 min. The PTFE sheets were peeled, whereby the pair of catalyst layers was transferred onto the solid polymeric electrolyte membrane. Then, the electrolyte membrane and the pair of catalyst layers were assembled each other.

(Step 6)

The assembly including the hydrophobic catalyst layer of the present invention on a cathode side and the catalyst layer of platinum on carbon support on an anode side was covered with carbon clothes (LT-1400W manufactured by E-TEK) serving as a gas baking layer, and further with a fuel electrode and an air electrode in such order as shown in FIG. 1, whereby a single cell was formed.

Figure 3:
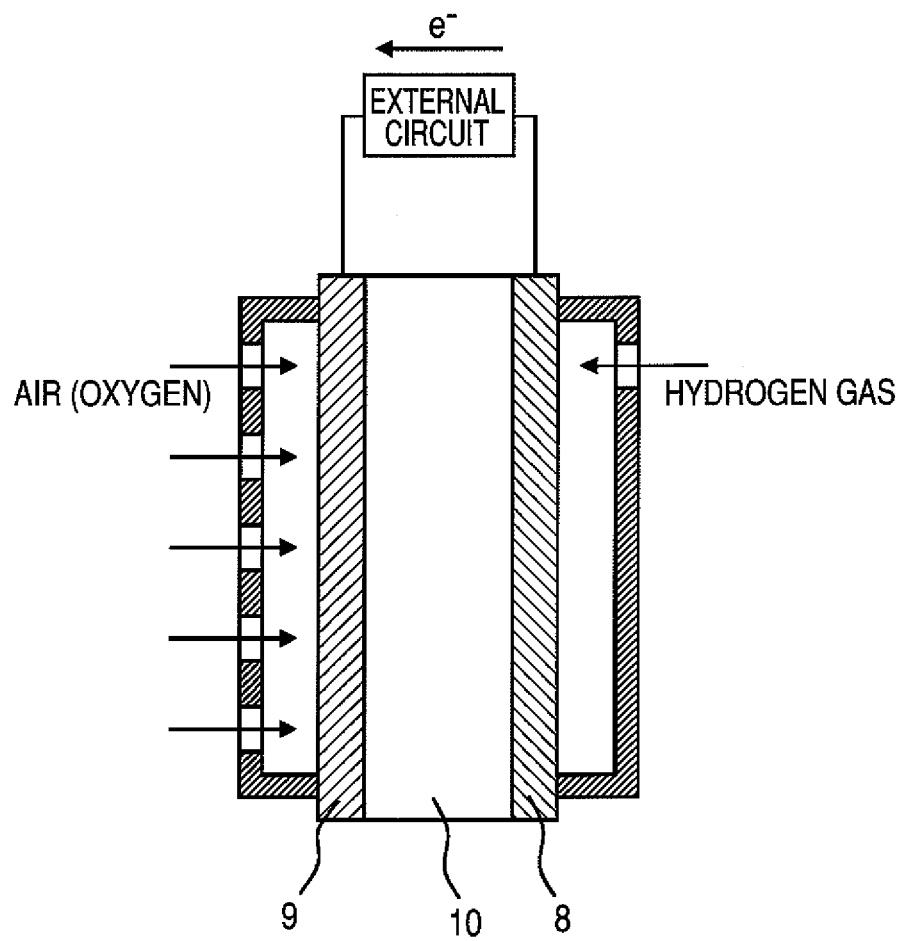
FIG. 3 is a schematic view showing an apparatus for evaluating a polymer electrolyte fuel cell.
Figure 9:
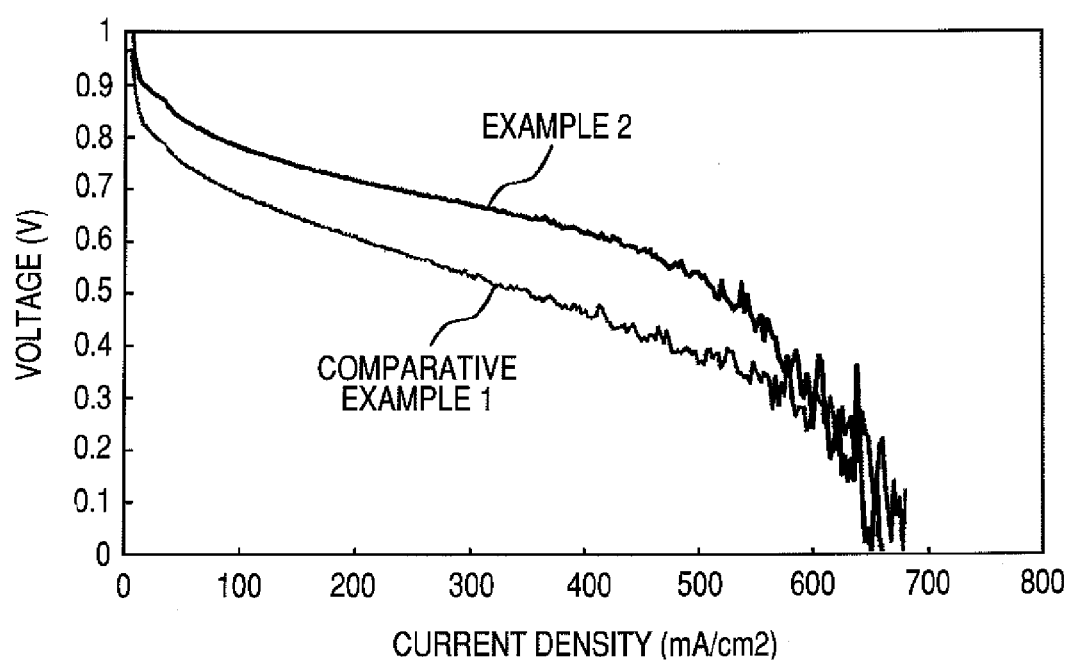
FIG. 9 is a graph showing characteristics of polymer electrolyte fuel cells of Example 2 and Comparative Example 1 of the present invention.

The single cell produced through the above steps was evaluated for characteristics by using an evaluation apparatus having the constitution shown in FIG. 3. An electrical discharge test was performed at a cell temperature of 80° C. while the anode electrode side was filled with a hydrogen gas in a dead end manner and the cathode electrode side was opened to the air. As a result, current-voltage characteristics shown in FIG. 9 were obtained.

Comparative Example 1

Figure 7:
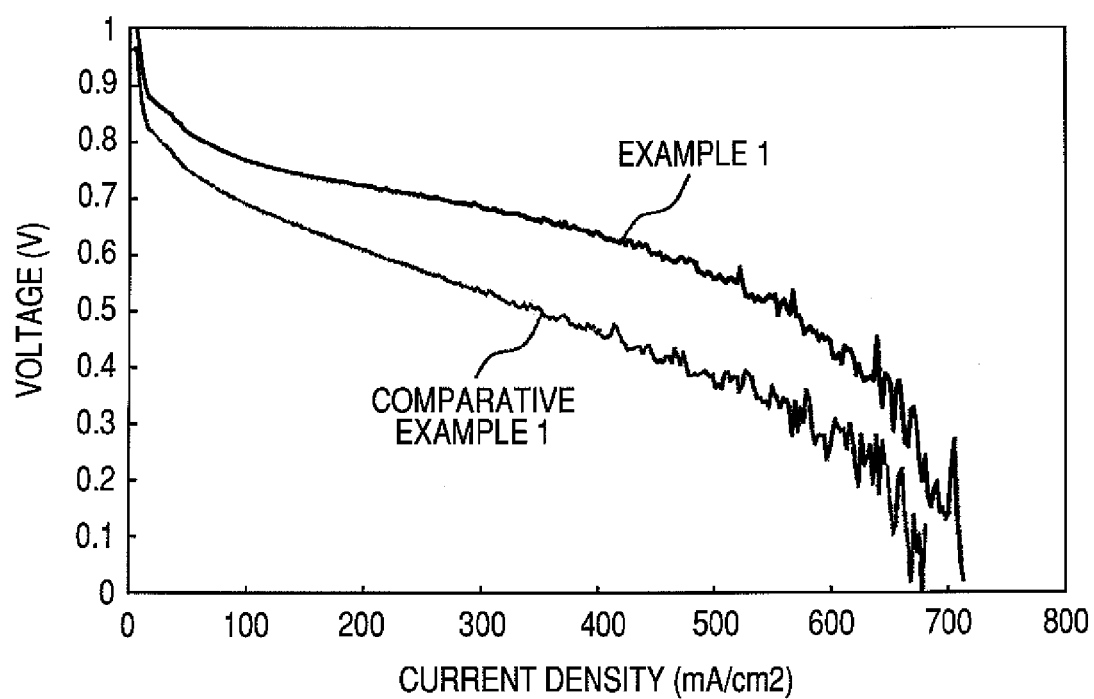
FIG. 7 is a graph showing characteristics of polymer electrolyte fuel cells of Example 1 and Comparative Example 1 of the present invention.

FIG. 7 shows, as Comparative Example 1, an example using a catalyst layer produced in the same manner as in Example 1 except that (Step 2) described above was omitted. The Pt carrying amount of the catalyst layer was the same as that of Example 1, that is, 0.85 mg/$cm^2$. In addition, the equilibrium contact angle of the catalyst layer of Comparative Example 1 with respect to water was 6.3°, and the surface of the catalyst layer was hydrophilic. In addition, the Si/Pt ratio of Comparative Example 1 was zero because methylsiloxane was not applied thereto.

First, comparison between current densities at 0.9 V as a reaction rate-determining region confirmed that the current density of Example 1 was 12.3 mA/$cm^2$ though the current density of Comparative Example 1 was 7.6 mA/$cm^2$. Furthermore, comparison between catalytic specific activities each obtained by dividing a current density by a Pt carrying amount confirmed that the catalytic specific activity of Example 1 was 14.5 A/g though the catalytic specific activity of Comparative Example 1 was 8.9 A/g.

That is, the deterioration of cell characteristics in the catalyst layer of Example 1 due to activation polarization was significantly suppressed as compared to that in the catalyst layer of Comparative Example 1. This result shows that the methylsiloxane polymer of Example 1 does not inhibit an oxidation-reduction reaction on the surface of the catalyst, or rather improves the activity of the catalyst layer. This is probably due to an increase in effective surface area of the catalyst layer as described later.

In addition, comparison between voltages at 600 mA/$cm^2$ as a diffusion polarization rate-determining region confirmed that a voltage of 0.42 V or more was taken from the single cell of Example 1 but only about 0.3 V was taken from the single cell of Comparative Example 1. That is, the deterioration of cell characteristics in the catalyst layer of Example 1 due to diffusion polarization was significantly suppressed as compared to that in the catalyst layer of Comparative Example 1. This shows that the hydrophobic catalyst layer of Example 1 is superior to the catalyst layer of Comparative Example 1 in dissipation property of produced water.

Figure 8:
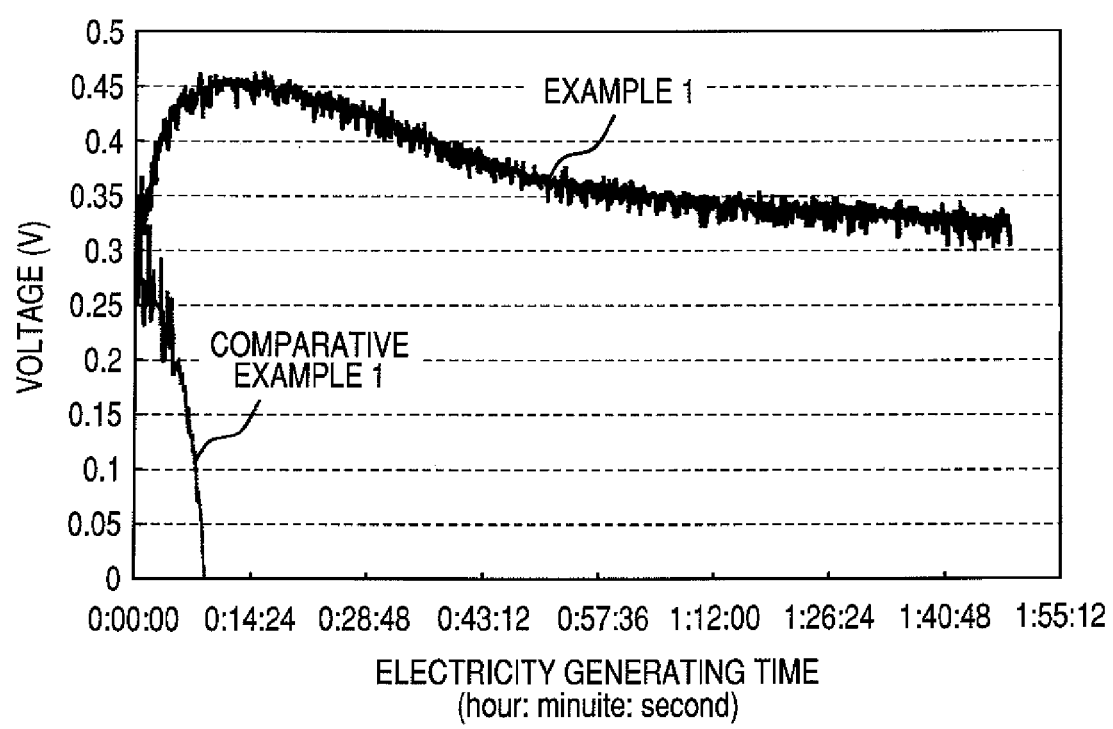
FIG. 8 is a graph showing changes with the elapse of time in voltages of the polymer electrolyte fuel cells of Example 1 and Comparative Example 1 of the present invention at an output current density of 600 mA/cm$^2$.

Next, FIG. 8 shows a change with the elapse of time in voltage when the single cell of Example 1 was caused to generate electricity continuously at a current density of 600 mA/$cm^2$ together with the result of the single cell of Comparative Example 1.

The single cell using the hydrophobic catalyst layer of Example 1 had a voltage of 0.3 V or more even after the lapse of 1 hour and 40 minutes. In contrast, the voltage of the single cell of Comparative Example 1 became zero in 12 minutes, and electricity generation stopped.

This shows that the hydrophobic catalyst layer of Example 1 significantly improved the stability of the performance of a fuel cell because the layer was superior to the catalyst layer of Comparative Example 1 in dissipation property of produced water.

Next, cyclic voltammogram measurement was performed at a cell temperature of 80° C. while a hydrogen gas was flowed at 20 sccm to the anode electrode side and an $N_2$ gas was flowed at 40 sccm to the cathode electrode side, whereby an $H^+$ adsorption area per unit electrode area, that is, an effective surface area was measured.

While the effective surface area of the catalyst layer of Example 1 per unit area of the electrode was 282 $cm^2$, the effective surface area of the catalyst layer of Comparative Example 1 was 208 $cm^2$. Although the hydrophobic catalyst layer of Example 1 and the catalyst layer of Comparative Example 1 had the same platinum carrying amount, the effective surface area of the hydrophobic catalyst layer of Example 1 increased as compared to that of the catalyst layer of Comparative Example 1 by 30% or more, so that the utilization factor of the catalyst significantly increased.

Example 2

In this example, the constitution of a polymer electrolyte fuel cell shown in FIG. 1 as the embodiment of the present invention was produced by using the catalyst layer of the present invention and a method of producing the catalyst layer.

Hereinafter, the production steps of the polymer electrolyte fuel cell according to this example will be described in detail.

(Step 1)

A gold thin film having a thickness of 50 nm was formed by means of an electron beam vacuum evaporation method on a PTFE sheet (NITFLON manufactured by NITTO DENKO CORPORATION) as a layer to be transferred onto a solid polymeric electrolyte membrane. A porous platinum oxide layer having a thickness of 2 μm was formed thereon by means of a reactive sputtering method. The reactive sputtering was performed under the conditions of: a total pressure of 5 Pa; an oxygen flow rate ratio ($Q_{O2}/(Q_{Ar}+Q_{O2})$) of 70%; a substrate temperature of 25° C.; and an RF input power of 5.4 W/cm$^2$.

(Step 2)

Subsequently, the porous platinum oxide layer was brought into contact with the steam of 1,1,1,3,3,3-hexamethyldisilazane (having a partial pressure of 105 hPa) at 50° C. for 10 minutes under irradiation with an ultraviolet, whereby the film of a methylsiloxane polymer was formed on the surface of a platinum oxide. After that, it was subjected to a heat treatment in the atmosphere at 180° C. for 3 hours, whereby the condensation polymerization of unpolymerized Si—OH groups was promoted.

The subsequent steps ((Step 3) to (Step 6)) were performed in the same manner as in Example 1, whereby a single cell was formed. The Pt carrying amount in this example was 0.85 mg/cm$^2$. In addition, the equilibrium contact angle of the catalyst layer with respect to water was 138°, and the surface of the catalyst layer was hydrophobic. In addition, the Si/Pt ratio in this example was 0.18.

The single cell produced through the above steps was evaluated for characteristics by using an evaluation apparatus having the constitution shown in FIG. 3. An electrical discharge test was performed at a cell temperature of 80° C. while a hydrogen gas was flowed to the anode electrode side and the air was flowed to the cathode electrode side. As a result, current-voltage characteristics shown in FIG. 9 were obtained.

First, comparison between current densities at 0.9 V as a reaction rate-determining region confirmed that the current density of Example 2 was 14.9 mA/cm$^2$ though the current density of Comparative Example 1 was 7.6 mA/cm$^2$. Furthermore, comparison between catalytic specific activities each obtained by dividing a current density by a Pt carrying amount confirmed that the catalytic specific activity of Example 2 was 17.5 A/g though the catalytic specific activity of Comparative Example 1 was 8.9 A/g.

That is, the deterioration of cell characteristics in the catalyst layer of Example 2 due to activation polarization was significantly suppressed as compared to that in the catalyst layer of Comparative Example 1. This result shows that the methylsiloxane polymer of Example 2 does not inhibit an oxidation-reduction reaction on the surface of the catalyst, or rather improves the activity of the catalyst.

In addition, comparison between voltages at 500 mA/cm$^2$ as a diffusion polarization rate-determining region confirmed that a voltage of 0.53 V was taken from the single cell of Example 2 but only 0.4 V or less was taken from the single cell of Comparative Example 1. That is, the deterioration of cell characteristics in the catalyst layer of Example 2 due to diffusion polarization was significantly suppressed as compared to that in the catalyst layer of Comparative Example 1. This shows that the hydrophobic catalyst layer of Example 2 is superior to the catalyst layer of Comparative Example 1 in dissipation property of produced water.

Figure 10:
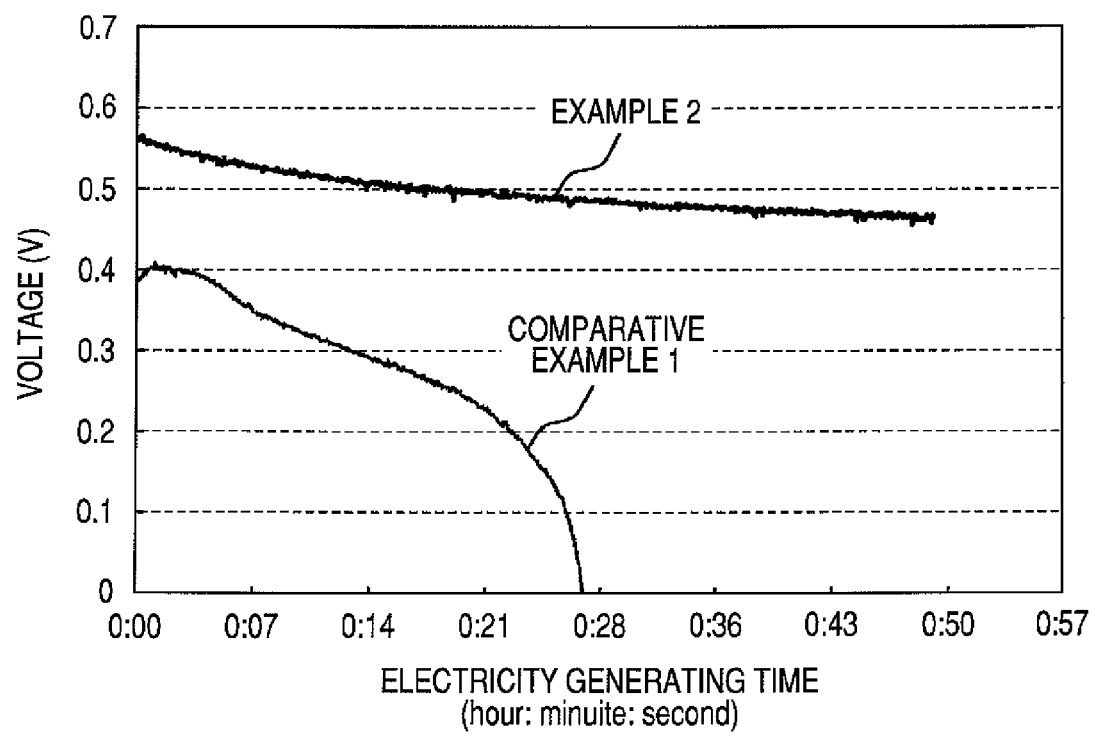
FIG. 10 is a graph showing changes with the elapse of time in voltages of the polymer electrolyte fuel cells of Example 2 and Comparative Example 1 of the present invention at an output current density of 500 mA/cm$^2$.

Next, FIG. 10 shows a change with the elapse of time in voltage when the single cell of Example 2 was caused to generate electricity continuously at a current density of 500 mA/cm$^2$ together with the result of the single cell of Comparative Example 1.

The single cell using the hydrophobic catalyst layer of Example 2 had a voltage of 0.48 V even after the lapse of 50 minutes. In contrast, the voltage of the single cell of Comparative Example 1 became zero in about 27 minutes, and electricity generation stopped. This shows that the hydrophobic catalyst layer of the present invention significantly improved the stability of the performance of a fuel cell because the layer was superior to the catalyst layer of Comparative Example 1 in dissipation property of produced water.

Next, cyclic voltammogram measurement was performed at a cell temperature of 80° C. while a hydrogen gas was flowed at 20 sccm to the anode electrode side and an N$_2$ gas was flowed at 40 sccm to the cathode electrode side, whereby an effective surface area was measured.

While the effective surface area of the catalyst layer of Example 1 per unit area of the electrode was 236 cm$^2$, the effective surface area of the catalyst layer of Comparative Example 1 was 208 cm$^2$. The effective surface area of the hydrophobic catalyst of Example 2 increased by 13% or more, as compared to that in the case where a catalyst not subjected to any hydrophobic treatment was used, so that the utilization ratio of the catalyst significantly increased.

Example 3

(Step 1)

A porous platinum oxide layer having a thickness of 2 μm was formed by means of a reactive sputtering method on a surface composed of carbon fine particles of carbon cloth (LT-1400W manufactured by E-TEK) as a substrate for a catalyst layer serving also as a gas-diffusion layer. The reactive sputtering was performed under the conditions of: a total pressure of 5 Pa; an oxygen flow rate ratio ($Q_{O2}/(Q_{Ar}+Q_{O2})$) of 70%; a substrate temperature of 25° C.; and an RF input power of 5.4 W/cm$^2$.

(Step 2)

Subsequently, the composite of the porous platinum oxide layer and the gas-diffusion layer was brought into contact with the steam of TMCTS (having a partial pressure of 0.05 Pa) at 25° C. for 5 minutes, whereby a methylsiloxane polymer was formed on the surface of a platinum oxide. In Example 3, a heat treatment like Example 1 was not performed as a subsequent step.

(Step 3)

Subsequently, the obtained catalyst layer was subjected to a reduction treatment in a 2% H$_2$/He atmosphere at 0.1 MPa for 30 minutes, whereby a porous platinum catalyst layer-gas baking layer composite was obtained. The Pt carrying amount in this case was 0.85 mg/cm$^2$. The equilibrium contact angle of the catalyst layer with respect to water at this time was 131°, and the surface of the catalyst layer was hydrophobic.

After that, a 5-wt % Nafion solution (manufactured by Wako Pure Chemical Industries, Ltd.) was dropped to the obtained catalyst layer in an amount of 8 μl per 1 cm$^2$ of a catalyst area, and the solvent was volatilized in a vacuum, whereby a proton path was formed on the surface of the catalyst.

(Step 4)

A solid polymeric electrolyte membrane (Nafion 112 manufactured by DuPont) was sandwiched between the hydrophobic catalyst layer produced in (Step 3) described above and the catalyst layer of platinum on carbon support obtained in (Step 4) of Example 1, and they were subjected to hot pressing under the pressing conditions of 4 MPa, 150° C., and 20 min. The PTFE sheet on the side of the catalyst layer of platinum on carbon support was peeled, whereby the pair of catalyst layers was transferred onto the solid polymeric electrolyte membrane. Thus, an MEA integrated with the gas baking layer was obtained.

The subsequent steps ((Step 5) and (Step 6)) were performed in the same manner as in Example 1, whereby a single cell was formed.

Figure 11:
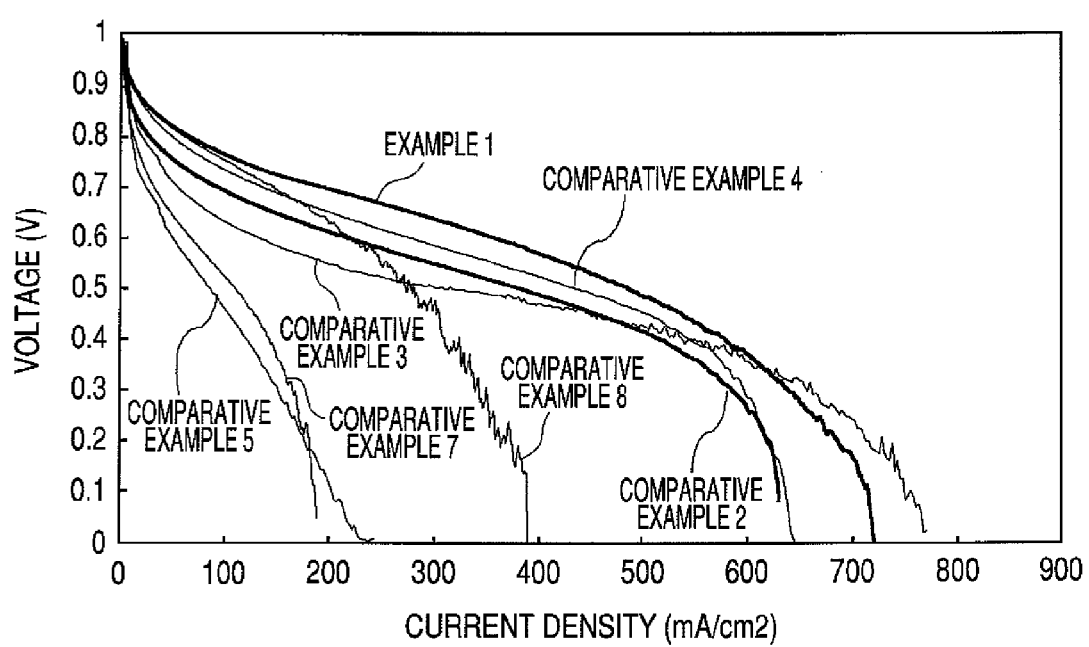
FIG. 11 is a graph showing characteristics of polymer electrolyte fuel cells of Example 3 and Comparative Examples 2 to 5 and 7 and 8 of the present invention.

The single cell produced through the above steps was subjected to an electrical discharge test in the same manner as in Example 1. FIG. 11 shows the result.

In addition, comparative examples for Example 3 are described below. FIG. 11 shows the current-voltage characteristics of each comparative example. In addition, for easy comparison, Table 1 shows the current density at 0.9 V, catalytic specific activity, critical current value, effective surface area, and ratio Si/Pt of the number of Si atoms to the number of Pt atoms of each of Example 3 and comparative examples.

Comparative Example 2

A single cell was formed by using a catalyst layer produced in the same manner as in Example 3 except that (Step 2) was omitted. The Pt carrying amount of the catalyst layer was the same as that of Example 3, that is, 0.84 mg/cm$^2$. In addition, the equilibrium contact angle of the catalyst layer of Comparative Example 2 with respect to water was 6.3°, and the surface of the catalyst layer was hydrophilic.

Comparative Example 3

A single cell was formed by using a catalyst layer produced in the same manner as in Example 3 except that, in (Step 2), instead of being brought into contact with the steam of TMCTS, the porous platinum oxide layer was immersed in a tetrafluoroethylene (PTFE) dispersion solution (Polyfron, 60 wt. %, manufactured by DAIKIN INDUSTRIES, ltd., average particle size 300 μm) diluted with pure water to have a concentration of 20%, and was then lifted and air-dried at room temperature.

The Pt carrying amount in this case was 0.84 mg/cm$^2$. The equilibrium contact angle of the catalyst layer with respect to water was 146°, and the surface of the catalyst layer was hydrophobic.

Comparative Example 4

A single cell was formed by using a catalyst layer produced in the same manner as in Example 3 except that, in (Step 2), the porous platinum oxide layer was brought into contact with the steam of TMCTS (having a partial pressure of 0.05 Pa) at 25° C. for 1 minute.

The Pt carrying amount in this case was 0.84 mg/cm$^2$. The equilibrium contact angle of the catalyst layer with respect to water was 20°, and the surface of the catalyst layer was hydrophilic.

Comparative Example 5

A single cell was formed by using a catalyst layer produced in the same manner as in Example 3 except that, in (Step 2), the porous platinum oxide layer was brought into contact with the steam of TMCTS (having a partial pressure of 0.05 Pa) at 25° C. for 60 minutes.

The Pt carrying amount in this case was 0.84 mg/cm$^2$. The equilibrium contact angle of the catalyst layer with respect to water was 138°, and the surface of the catalyst layer was hydrophobic.

Comparative Example 6

A catalyst layer was produced in the same manner as in Example 3 except that: (Step 2) was performed after the hydrogen reduction treatment of (Step 3); and, in (Step 2), the porous platinum oxide layer was brought into contact with the steam of TMCTS (having a partial pressure of 0.05 Pa) at 25° C. for 3 minutes.

The catalyst layer was subjected to hot pressing against a solid polymeric electrolyte membrane (Nafion 112) in the same manner as in (Step 4) of Example 3. As a result, at a large number of positions the catalyst layer could not be transferred onto Nafion 112 occurred, and an MEA could not be formed.

Comparative Example 7

A single cell was formed by using a catalyst layer produced in the same manner as in Example 3 except that: the thickness of the platinum oxide layer was set to about 1.8 μm in (Step 1); (Step 2) of Example 3 was performed after the hot pressing of (Step 5) (the order of steps was changed); and, in (Step 2), the porous platinum oxide layer was brought into contact with the steam of TMCTS (having a partial pressure of 0.02 Pa) at 4° C. for 3 minutes.

The Pt carrying amount in this case was 0.71 mg/cm$^2$. The equilibrium contact angle of the catalyst layer with respect to water was 138°, and the surface of the catalyst layer was hydrophobic.

Comparative Example 8

A single cell was formed by using a catalyst layer produced in the same manner as in Example 3 except that: the thickness of the platinum oxide layer was set to about 3 μm in (Step 1); (Step 2) was performed after the hot pressing of (Step 5) (the order of steps was changed); and, in (Step 2), the porous platinum oxide layer was brought into contact with the steam of TMCTS (having a partial pressure of 0.05 Pa) at 25° C. for 6 minutes.

The Pt carrying amount in this case was 1.1 mg/cm$^2$. The equilibrium contact angle of the catalyst layer with respect to water was 138°, and the surface of the catalyst layer was hydrophobic.

FIG. 11 and Table 1 show the results of Example 3 and Comparative Examples 2 to 5 and 7 and 8.

The effective surface area of each of Comparative Examples 7 and 8 is not measured because it is judged to be difficult to compare the effective surface area of each of Comparative Examples 7 and 8 with that of Example 3 owing to a large difference in Pt carrying amount between each of Comparative Examples 7 and 8, and Example 3. In addition, no Si atom was observed in each of Comparative Examples 2 and 3 because methylsiloxane was not added thereto.

TABLE 1

| | Current density at 0.9 V (mA/cm²) | Catalytic specific activity (A/g) | Critical current density (mA/cm²) | Si/Pt ratio | Effective surface area per unit area of electrode (cm²) |
|---|---|---|---|---|---|
| Example 3 | 11.5 | 13.6 | 720.5 | 0.21 | 240.1 |
| Comparative Example 2 | 7.2 | 8.6 | 631.3 | 0.00 | 205.4 |
| Comparative Example 3 | 4.0 | 4.8 | 770.0 | 0.00 | 190.0 |
| Comparative Example 4 | 10.4 | 12.3 | 645.7 | 0.14 | 209.4 |
| Comparative Example 5 | 6.4 | 7.6 | 242.5 | 0.36 | 177.4 |
| Comparative Example 7 | 3.3 | 4.6 | 188.4 | 0.30 | |
| Comparative Example 8 | 7.8 | 7.1 | 389.6 | 0.34 | |

As can be seen from Example 3 and Table 1, Example 3 had the largest specific activity, and provided a voltage value higher than that of any other comparative examples over a wide current density range of 100 to 500 mA/cm². In addition, the critical current density of Example 3 considerably increased as compared to that of Comparative Example 2.

In addition, as in the case of each of Examples 1 and 2, the specific activity and effective surface area of Example 3 considerably increased as compared to those of Comparative Example 2 in which no hydrophobic treatment was performed. This shows that the utilization factor of a catalyst increases.

In Comparative Example 3, a critical current density was high, but specific activity and a voltage up to 600 mA/cm² considerably reduced as compared to those of Example 3. This is probably because the particle size of a PTFE fine particle was as large as several hundreds of micrometers, so that the hydrophobic agent was not dispersed, and hence the catalyst layer could not be effectively made hydrophobic.

In addition, the specific activity and voltage up to 450 mA/cm² of Comparative Example 3 are smaller than those of Comparative Example 2 in which no hydrophobic treatment was performed.

That is, the reason why the reduced utilization factor of the catalyst in Comparative Example 3 is probably as follows. Although the impartment of hydrophobicity to the catalyst layer by a PTFE fine particle was attained, a part in which an excessively large amount of PTFE fine particles were present and a part in which an excessively small amount of PTFE fine particles were present appeared in the catalyst layer, and gas diffusion in each of the parts was inhibited.

The current-voltage characteristics of Comparative Example 4 slightly improved as compared to those of Comparative Example 2 in which no hydrophobic treatment was performed, but were inferior to those of Example 3.

In addition, the specific activity of Comparative Example 4 improved as compared to that of Comparative Example 2. However, the critical current and effective surface area of Comparative Example 4 kept to be comparable to those of Comparative Example 2, and did not reach those of Example 3.

This is probably because the time period for contact of the porous platinum oxide layer with the steam of TMCTS was so short that sufficient hydrophobicity could not be imparted to the catalyst layer.

The specific activity, critical current, and effective surface area of Comparative Example 5 considerably reduced as compared to those of Example 3. This is probably because the time period for contact of the porous platinum oxide layer with the steam of TMCTS was so long that an excessive amount of a methylsiloxane polymer was produced in the catalyst layer.

That is, the performance of the fuel cell reduced owing to the excessive amount of methylsiloxane probably because (1) the amount of the catalyst surface covered with methylsiloxane excessively increased so that a contact area between Nafion as an electrolyte and the catalyst reduced and (2) the pores in the catalyst layer were clogged with methylsiloxane so that the diffusion property of an oxygen gas reduced.

The results of Examples 1 to 3 and Comparative Examples 4 and 5 show that the Si/Pt ratio is preferably in the range of about 0.15 or more and 0.25 or less in order to obtain a hydrophobic catalyst layer having high performance by using the constitution of the present invention. In addition, the results show that it is important to appropriately control the time period for contact of the steam of TMCTS and a platinum oxide with each other.

As described above, in Comparative Example 6, an MEA could not be produced owing to the occurrence of a portion where the catalyst layer was insufficiently transferred onto Nafion 112.

This is because a reaction rate in each of hydrolysis and a polymerization reaction caused by catalyst contact between TMCTS and a platinum catalyst was higher than a reaction rate in each of hydrolysis and a polymerization reaction caused by catalyst contact between TMCTS and a platinum oxide catalyst, so that these reactions excessively proceeded.

That is, the adhesiveness between Nafion 112 and the catalyst layer reduced as a result of the formation of an excessive amount of a methylsiloxane polymer in the catalyst layer due to contact between a platinum catalyst having high activity and TMCTS.

The specific activity and critical current of each of Comparative Examples 7 and 8 considerably reduced as compared to those of Example 3. In particular, each of the current density at 0.9 V, specific activity, and critical current of Comparative Example 8 was lower than that of Example 3 despite the fact that the Pt carrying amount of Comparative Example 8 was larger than that of Example 3.

This is because an excessive amount of a methylsiloxane polymer was produced in the catalyst layer owing to contact between a platinum catalyst having high activity and TMCTS as in the case of Comparative Example 5.

Furthermore, in the steps of each of Comparative Examples 7 and 8, after the reduction of the catalyst, Nafion is added, and then TMCTS is brought into contact with the catalyst. In this case, the hydrolysis of TMCTS proceeds in the vicinity of a surface of Pt not covered with Nafion, so that the formation of methylsiloxane centers on the vicinity. Accordingly, a so-called three-phase interface (interface where platinum, Nafion, and a reactant gas simultaneously contacted with one another) was covered with methylsiloxane, so that the area of the three-phase interface probably considerably reduced. As a result, the performance of the fuel cell reduced.

The results of Comparative Examples 6, 7 and 8 show that it is necessary that a platinum oxide is subjected to a reduction treatment after the steam of TMCTS and the platinum oxide have been brought into contact with each other in order to obtain a hydrophobic catalyst layer having high performance by using the constitution of the present invention.

As shown in the foregoing examples, the use of the hydrophobic catalyst layer according to the present invention as a catalyst layer for a polymer electrolyte fuel cell provided a fuel cell having: significantly improved dissipation property of produced water and a significantly increased utilization factor of a catalyst in the catalyst layer; and excellent cell characteristics. Furthermore, the method of producing a catalyst layer according to the examples was able to realize a polymer electrolyte fuel cell having stable characteristics at a low cost because the method was an easy, inexpensive, highly reproducible process.

Industrial Applicability

The hydrophobic catalyst layer of the present invention can be used as a catalyst layer for a polymer electrolyte fuel cell because the dissipation property of produced water and the utilization factor of the catalyst in the catalyst layer can be improved.

In addition, a polymer electrolyte fuel cell having the catalyst layer can be used as a fuel cell for a small-size electrical apparatus such as a portable phone, a notebook personal computer, or a digital camera.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-132957, filed on Apr. 28, 2005, which is hereby incorporated by reference herein in its entirety.

What is claimed is:

1. A method of producing a hydrophobic catalyst layer for a polymer electrolyte fuel cell, comprising the steps of:
   bringing an Si compound containing a hydrophobic substituent into contact with a platinum oxide to cause a hydrolytic reaction owing to a catalytic action of the platinum oxide to form a polymerizable group;
   subjecting the Si compound to a polymerization reaction in a vicinity of the platinum oxide to form a hydrophobic agent on a surface of the platinum oxide; and
   then reducing the platinum oxide.

2. A method of producing a hydrophobic catalyst layer for a polymer electrolyte fuel cell according to claim 1, wherein the Si compound containing the hydrophobic substituent comprises at least one or more compounds selected from the group consisting of 2,4,6,8-tetraalkylcyclotetrasiloxane, 1,1,1,3,3,3-hexaalkyl-disilazane, monoalkylsilane, dialkylsilane, and trialkylsilane, or a mixture thereof.

3. A method of producing a polymer electrolyte fuel cell, comprising a step of forming a hydrophobic catalyst layer by a method of producing a hydrophobic catalyst layer for a polymer electrolyte fuel cell according to claim 1.

* * * * *